United States Patent
Smoyer et al.

(10) Patent No.: US 9,456,009 B2
(45) Date of Patent: Sep. 27, 2016

(54) METHOD AND APPARATUS FOR SECURELY TRANSMITTING LAWFULLY INTERCEPTED VOIP DATA

(75) Inventors: Clinton J. Smoyer, Raymore, MO (US); Shane M. Smith, Paola, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1995 days.

(21) Appl. No.: 11/890,194

(22) Filed: Aug. 3, 2007

(65) Prior Publication Data
US 2009/0034510 A1    Feb. 5, 2009

(51) Int. Cl.
H04L 12/26 (2006.01)
H04L 12/24 (2006.01)
G06F 13/30 (2006.01)
H04L 29/06 (2006.01)
H04M 3/22 (2006.01)

(52) U.S. Cl.
CPC .......... H04L 65/1076 (2013.01); H04L 63/30 (2013.01); H04M 3/2281 (2013.01)

(58) Field of Classification Search
CPC .................. H04M 3/2281; H04M 2215/0188; H04L 63/30; H04L 66/1076
USPC .......... 370/352–356, 231, 466, 363; 709/227
See application file for complete search history.

(56) References Cited

U.S. PATENT DOCUMENTS

| | | | |
|---|---|---|---|
| 7,400,905 B1 | 7/2008 | Malkin et al. | |
| 7,973,818 B2 | 7/2011 | Agrawal | |
| 8,051,130 B2 | 11/2011 | Logan et al. | |
| 8,229,078 B2 | 7/2012 | Wright et al. | |
| 8,841,986 B2 | 9/2014 | Holman | |
| 8,874,645 B2 | 10/2014 | Espelien | |
| 9,357,065 B2 | 5/2016 | Sweeney et al. | |
| 2002/0150081 A1* | 10/2002 | Fang | 370/352 |
| 2004/0022237 A1* | 2/2004 | Elliott et al. | 370/356 |
| 2004/0157629 A1* | 8/2004 | Kallio et al. | 455/466 |

(Continued)

OTHER PUBLICATIONS

Milanovic et al. "Distributed system for lawful interception in VoIP networks", EUROCON 2003. Computer as a Tool. The IEEE Region 8, Sep. 22-24, 2003.*

(Continued)

Primary Examiner — Khaled Kassim
Assistant Examiner — Jason Harley
(74) Attorney, Agent, or Firm — Swanson & Bratschun, L.L.C.

(57) ABSTRACT

A method, apparatus, and computer usable program product for transmitting intercepted VOIP data are provided in the illustrative embodiments. A VOIP call is intercepted in response to a lawful request for intercept by a law enforcement agency. VOIP data associated with the intercepted VOIP call is encrypted. The encryption may use a virtual private network an encryption using a key of a specific length, bit stuffing, or other encryption methods. The encrypted VOIP data is transmitted to the law enforcement agency using a public data network either during the VOIP call or after the VOIP call. The intercept request may be made during the VOIP call, or before the VOIP call. Furthermore, the VOIP data of the VOIP call may be stored before transmitting to the law enforcement agency, and archived based on archiving rules. The request for the intercept may be queued for processing according to queuing rules. Notifications based on the request for intercept, VOIP call characteristics, or characteristics of the VOIP data may be sent to one or more law enforcement agencies, and may also be encrypted.

36 Claims, 3 Drawing Sheets

(56) References Cited

U.S. PATENT DOCUMENTS

| | | |
|---|---|---|
| 2005/0026599 A1 | 2/2005 | Carter |
| 2005/0063544 A1* | 3/2005 | Uusitalo et al. .............. 380/277 |
| 2005/0174937 A1* | 8/2005 | Scoggins et al. ............. 370/230 |
| 2005/0175156 A1* | 8/2005 | Afshar ................ H04L 63/0272 379/35 |
| 2005/0286549 A1* | 12/2005 | Murphy ........................ 370/463 |
| 2006/0018451 A1 | 1/2006 | Usuba et al. |
| 2006/0062366 A1 | 3/2006 | Tiruthani et al. |
| 2006/0111910 A1 | 5/2006 | Nelson |
| 2006/0265397 A1* | 11/2006 | Bryan ................. G06F 17/3089 |
| 2007/0106726 A1 | 5/2007 | Rosenberg |
| 2007/0165629 A1* | 7/2007 | Chaturvedi et al. .......... 370/389 |
| 2007/0174469 A1* | 7/2007 | Andress et al. ............. 709/227 |
| 2007/0211639 A1* | 9/2007 | Spalt ..................... H04L 63/304 370/241 |
| 2007/0297418 A1* | 12/2007 | Lee ........................ H04L 63/00 370/395.52 |
| 2008/0031427 A1 | 2/2008 | Kovales et al. |
| 2008/0063645 A1 | 3/2008 | Terato et al. |
| 2008/0077956 A1 | 3/2008 | Morrison et al. |
| 2008/0134278 A1 | 6/2008 | Al-Karmi |
| 2008/0200159 A1 | 8/2008 | Lai |
| 2008/0225848 A1* | 9/2008 | Pilon ................... H04M 11/062 370/390 |
| 2009/0005892 A1 | 1/2009 | Guetta et al. |
| 2009/0251526 A1 | 10/2009 | Book |
| 2009/0257565 A1 | 10/2009 | Nelson et al. |
| 2009/0299735 A1 | 12/2009 | Bouvet et al. |
| 2010/0014693 A1 | 1/2010 | Park et al. |
| 2010/0046729 A1 | 2/2010 | Bifano et al. |
| 2010/0239078 A1 | 9/2010 | Sweeney et al. |
| 2011/0205329 A1 | 8/2011 | Willis |

OTHER PUBLICATIONS

Thanthry et al. "CALEA Compliant Secure Voice Over IP System", Carnahan Conferences Security Technology, Proceedings 2006 40th Annual IEEE International, Oct. 2006.*

Milanovic et al. "Methods for lawful interception in IP telephony networks based on H.323", EUROCON 2003. Computer as a Tool. The IEEE Region 8, Sep. 22-24, 2003.*

U.S. Appl. No. 12/406,689; Final Rejection dated Jul. 2, 2012; 16 pages.

U.S. Appl. No. 12/406,689; Restriction Requirement dated Dec. 13, 2011; 5 pages.

U.S. Appl. No. 12/406,689; Non-Final Rejection dated Jan. 30, 2012; 15 pages.

U.S. Appl. No. 12/406,689; Non-Final Rejection dated Jan. 22, 2015; 19 pages.

U.S. Appl. No. 12/406,689; Final Rejection dated Sep. 17, 2015; 17 pages.

U.S. Appl. No. 12/406,689; Issue Notification dated May 11, 2016; 1 page.

* cited by examiner

METHOD AND APPARATUS FOR SECURELY TRANSMITTING LAWFULLY INTERCEPTED VOIP DATA

BACKGROUND

1. Field of the Invention

The principles of the present invention relate generally to an improved telecommunications system, and in particular, to transmitting data in the improved telecommunications system. Still more particularly, the principles of the present invention relate to a method, apparatus, and computer usable program product for transmitting lawfully intercepted Voice over Internet Protocol (VOIP) data.

2. Description of the Related Art

In October 1994, Congress took action to protect public safety and ensure national security by enacting the Communications Assistance for Law Enforcement Act of 1994 (CALEA), Pub. L. No. 103-414, 108 Stat. 4279. The law further defines the existing statutory obligation of telecommunications carriers to assist law enforcement in executing electronic surveillance pursuant to court order or other lawful authorization. Telecommunications carriers are providers of telecommunications services, such as a traditional telephone company. According to Congress, CALEA seeks to preserve law enforcement's ability to conduct lawfully authorized electronic surveillance while preserving public safety, the public's right to privacy, and the telecommunications industry's competitiveness.

Pursuant to CALEA, government agencies and law enforcement agencies (LEAs), such as the Federal Bureau of Investigation (FBI) and the Central Intelligence Agency (CIA), have required traditional phone companies to intercept a voice call connecting through their systems when the LEAs are lawfully authorized to intercept those calls. In compliance with those requirements, the phone companies intercept a call as requested, and deliver the call's contents to the LEAs. The call content may be delivered while the call is in progress, or may be stored and delivered after the call has concluded.

VOIP is a telecommunications method for transmitting voice communications over the Internet. Common VOIP implementations are in telephony where telephone conversations are partly carried over the Internet from a caller telephone to a called telephone. A VOIP call is a voice call connected using VOIP technology. VOIP data is the data that represents to the voice signals in a voice call that is connected through VOIP systems.

Call content is the substance of a voice call. Call content may be collected, stored, and transmitted in the form of analog or digital signals. Call content of a VOIP call is the VOIP data that represents the substance of the VOIP call.

A "caller telephone" is a telephone from which a voice call is placed A "called telephone" is a telephone on which a voice call is received. Similarly, a "caller communication device" is a communication device from which a voice call is placed; and a "called communication device" is a communication device on which a voice call in received.

The term "communication devices" refers to the collection of all devices used for voice telecommunications. For example, a communication device can be the familiar telephone, a computer with a communications enabling software application, a telephone like device that works over data networks instead of plain old telephone system (POTS) line, a wireless or cellular phone, or any other device used for voice communications. A communication device is any one of these communication devices.

The widespread adoption of VOIP technology as a substitute for voice call using traditional phone companies has prompted new requirements and amendments to existing requirements under CALEA. On May 3, 2006, the Federal Communications Commission (FCC) adopted a Second Report, Memorandum Opinion, and Order (Order), a revised implementation of CALEA. According to the FCC, the Order is adopted to ensure that Law LEAs have all of the resources that CALEA authorizes with regard to facilities-based broadband Internet access providers (also known as Internet service providers (ISP) and interconnected VOIP providers. A VOIP provider is a provider of telecommunications services using VOIP technology.

As one of its requirements, the Order requires VOIP providers to intercept calls connecting through their VOIP systems upon a request by an LEA and deliver the call contents to the LEA if the LEA is lawfully authorized to do so. In order to comply with the Order, VOIP providers are required to maintain a communications link to each LEA that may request a lawful intercept.

SUMMARY

To reduce the cost and complexity of the links to LEAs for lawful intercept of VOIP calls, the illustrative embodiments provide for securely transmitting the data of an intercepted VOIP call over a public data network. In one embodiment, the intercepted VOIP data is encrypted using an encryption technique, and the encrypted VOIP data is transmitted over a public data network thereby reducing the cost and complexity of complying with requests for intercepting VOIP calls.

The illustrative embodiments provide a method, apparatus, and computer usable program code for transmitting intercepted VOIP data. A VOIP call is intercepted in response to a request for intercept by a law enforcement agency. VOIP data associated with the intercepted VOIP call is encrypted. The encrypted VOIP data is transmitted to the law enforcement agency using a public data network.

BRIEF DESCRIPTION OF THE DRAWINGS

The novel features believed characteristic of the illustrative embodiments are set forth in the appended claims. The illustrative embodiments, however, as well as a preferred mode of use, will best be understood by reference to the following detailed description of an illustrative embodiment when read in conjunction with the accompanying drawings, wherein:

DETAILED DESCRIPTION OF THE DRAWINGS

Figure 1:
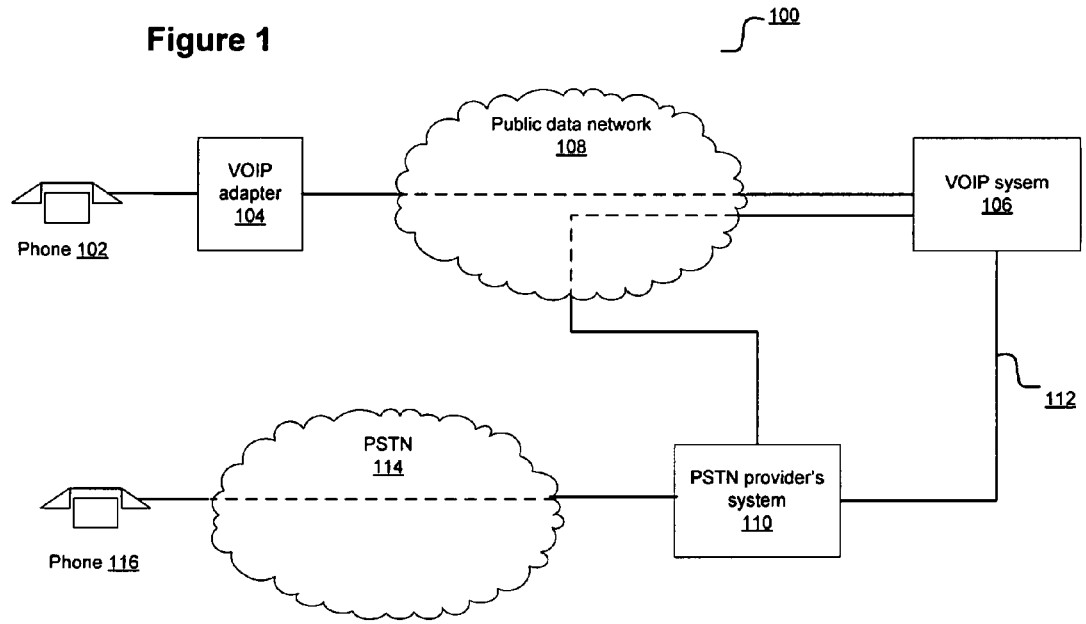
FIG. 1 depicts a block diagram of a VOIP telecommunications network in which illustrative embodiments may be implemented.

With reference to the figures, and in particular with reference to FIG. 1, exemplary diagrams of data processing environments are provided in which illustrative embodiments may be implemented. FIG. 1 is not intended to assert or imply any limitation with regard to the environments in which different embodiments may be implemented. Many modifications to the depicted environments may be made.

FIG. 1 depicts a block diagram of a VOIP telecommunications network in which illustrative embodiments may be implemented. A VOIP system 100 includes a telephone 102 that connects to a VOIP adapter 104. A telephone is a communications device. In one embodiment, telephone 102 may be a familiar telephone equipment commonly used in homes. In another embodiment, telephone 102 may be a software application running on a data processing system, such as a voice enabled application running on a computer. In other embodiments telephone 102 may be any other device, system, subsystem, application, or a combination thereof suitable for voice communications. VOIP adapter 104 is an electronic device that can connect to telephone 102 and convert the voice signals to and from telephone 102 into data that can be processed for connecting a VOIP call. In one embodiment, telephone 102 and VOIP adapter 104 may be combined into one integrated device.

A VOIP system 106 is representative of the entire VOIP system that a VOIP provider uses for providing VOIP services. VOIP system 106 may include a VOIP gateway and many other equipments, all of which together enable a VOIP provider to provide VOIP services. VOIP adapter 104 communicates with VOIP system 106 over a public data network 108. Public data network 108 is a data network available for use by any member of the public who is equipped to connect with the data network. An example of public data network 108 is the Internet.

For completing VOIP calls, such as a VOIP call originating from telephone 102, VOIP system 106 communicates with providers of regular telephone services, such as public switched telephone network (PSTN) providers, as well as other VOIP providers. FIG. 1 depicts VOIP system 106 in communication with a PSTN provider's system 110. VOIP system 106 may communicate with PSTN provider's system 110 using a dedicated communications link 112, or using Public data network 108. PSTN provider's system 110 uses a PSTN network 114 for completing the call that originated as a VOIP call from telephone 102 to a telephone 116. A dedicated communications link such as dedicated communications link 112, is a telecommunications link configured for enabling communications only between predetermined parties.

Likewise, a call originating from telephone 116 can be completed at telephone 102 by traversing VOIP system 100 in order from telephone 116 to telephone 102. FIG. 1 depicts only schematic components involved in VOIP system 100. Several other components, devices, systems, and interconnects may be present in a typical VOIP system but are not shown in FIG. 1 for clarity of the description.

Figure 2:
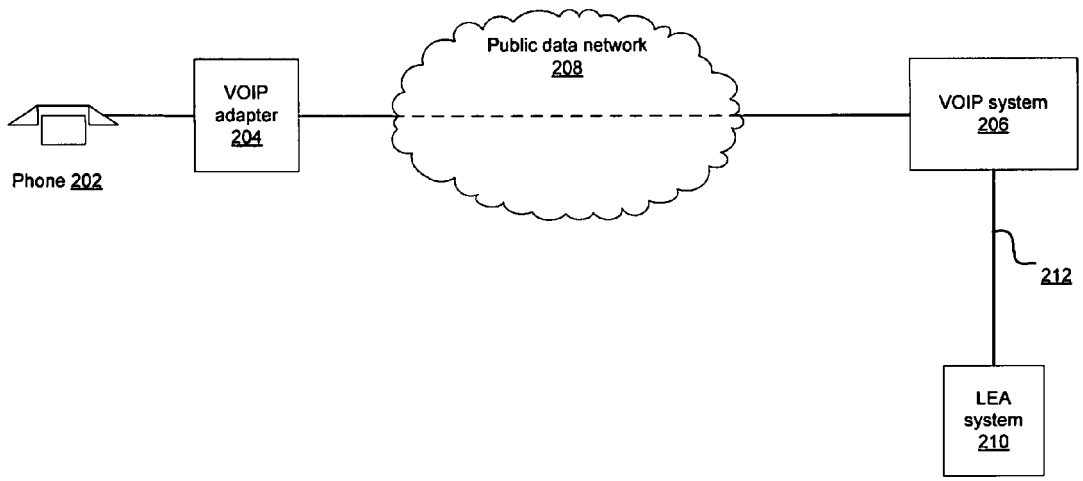
FIG. 2 depicts a block diagram of presently used dedicated communications link for compliance with CALEA requirements.

With reference to FIG. 2, this figure depicts a block diagram of presently used dedicated communications link for compliance with CALEA requirements. A telephone 202 is similar to telephone 102 in FIG. 1. A VOIP adapter 204 is similar to VOIP adapter 104 in FIG. 1. A VOIP system 206 is similar to VOIP system 106 in FIG. 1. A public data network 208 is similar to public data network 108 in FIG. 1, and may be the Internet.

Any government agency that may request an intercept of a voice call, is contemplated as an LEA in this disclosure. A LEA system 210 is a system that a LEA may use for processing the intercepted voice calls. Presently, VOIP providers, such as the VOIP provider using VOIP system 206, establish and maintain a dedicated communications link 212 with LEA system 210. The VOIP provider may maintain a dedicated communications link similar to dedicated communications link 212 for each LEA that may lawfully intercept a voice call.

Illustrative embodiments recognize that maintaining the communications links as dedicated communications links from numerous VOIP providers to numerous LEAs, for meeting CALEA requirements, can be expensive and cumbersome. Dedicated communications links are implemented for ensuring security in the transfer of call content to the LEA. However, dedicated bandwidth is expensive to procure, dedicated links are expensive to support with equipment and support staff, and dedicated links may have varying characteristics depending on which LEA they connect.

Therefore, a method, apparatus, and computer usable program product for securely transmitting VOIP data of a lawfully intercepted VOIP call over a public data network such as the Internet, may be useful. Internet as a public data network may reduce or eliminate the cost of dedicated communications links. Securing the transmission of VOIP data to a LEA using methods of securing Internet transmissions, such as encryption, may reduce or remove the complexity associated with managing and securing numerous dedicated communications links. For example, a dedicated communications link may require a combination of hardware and software specific to that dedicated communications link for securing the data traveling on it, which can be expensive to maintain and increase the complexity of the overall system by addition of special equipment. In contrast, securing Internet transmissions using commonly used encryption technologies, or even encryption specific to the parties is relatively light weight and unlikely to add equipment comparable to maintaining dedicated communications link.

Figure 3:
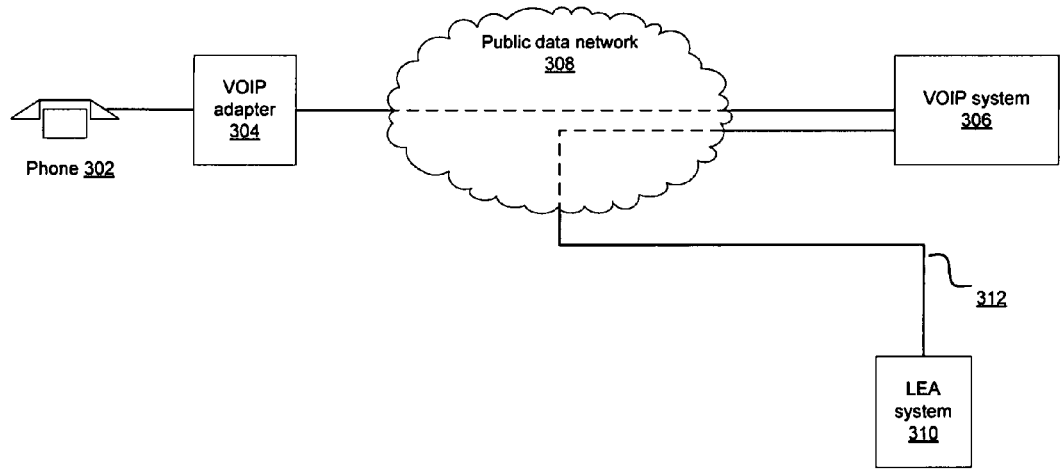
FIG. 3 depicts a block diagram of a secured communications link for compliance with CALEA requirements in accordance with an illustrative embodiment.

With reference to FIG. 3, this figure depicts a block diagram of a secured communications link for compliance with CALEA requirements in accordance with an illustrative embodiment. A telephone 302 is similar to telephone 202 in FIG. 2. A VOIP adapter 304 is similar to VOIP adapter 204 in FIG. 2. A VOIP system 306 may be implemented using VOIP system 206 in FIG. 2. A public data network 308 is similar to public data network 208 in FIG. 2. An LEA system 310 may be implemented using LEA system 210 in FIG. 2, and is a system that a LEA may use for processing the intercepted voice calls.

VOIP system 306 communicates with LEA system 310 using communications link 312 over public data network 308. In accordance with the illustrative embodiment, communications link 312 is a communications link that provides security to the data communicated over the communications link against pilfering by unintended recipients. A communications link 312 is not a dedicated communications link as described above. VOIP system 306 and LEA system 310 are configured to be able to securely communicate using communications link 312.

Figure 4:
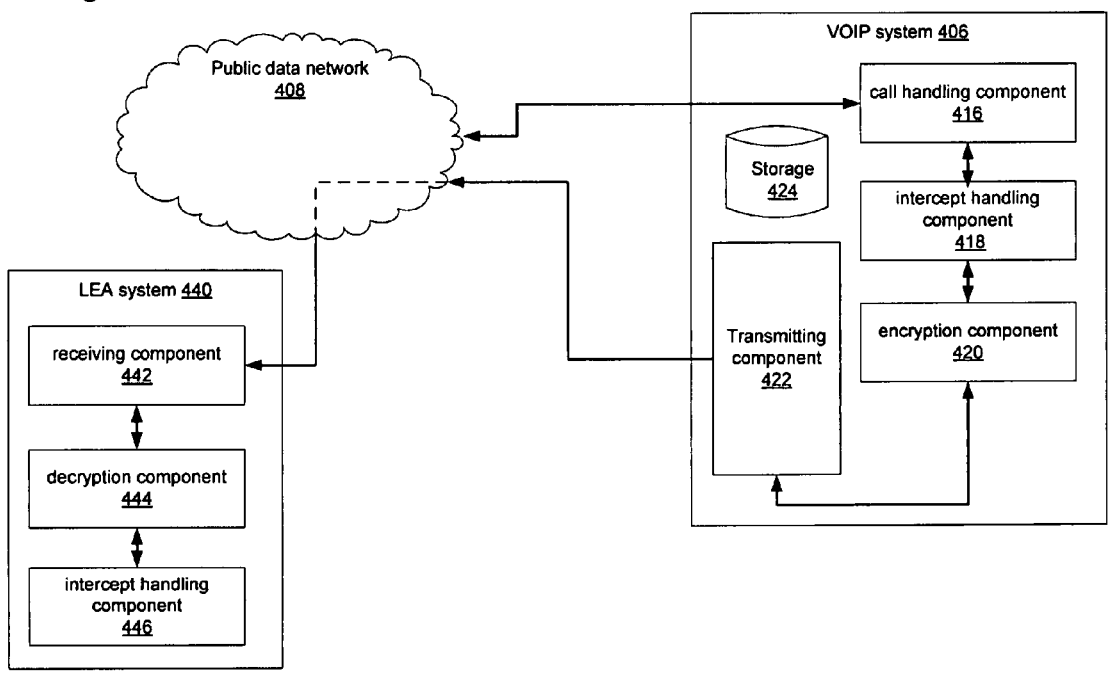
FIG. 4 depicts a detailed component level block diagram of the secured communications link in FIG. 3 in accordance with an illustrative embodiment.

With reference to FIG. 4, this figure depicts a detailed component level block diagram of the secured communications link in FIG. 3 in accordance with an illustrative embodiment. A VOIP system 406 may be implemented using VOIP system 306 in FIG. 3. A public data network 408 is similar to public data network 308 in FIG. 3.

VOIP system 406 includes a call handling component 416, which manages VOIP calls over Public data network 408. These VOIP calls originate or terminate at a communications device capable of making VOIP calls, such as telephone 302 in FIG. 3. VOIP system 406 further includes an intercept handling component 418, which accepts requests from LEAs for intercepting VOIP calls. Intercept handling component 418 communicates with call handling component 416 for performing a requested intercept. When a VOIP call is intercepted, an encryption component 420, in communication with intercept handling component 418 encrypts the VOIP data of the intercepted VOIP call.

Encryption component 420 then passes the encrypted VOIP data to other components or subsystems in VOIP system 406 that route it to public data network 408. A transmitting component 422 is one such component that transmits encrypted VOIP data to public data network 408. The routing to Public data network 408 may occur during the VOIP call or at a later time, and may include storing the VOIP data of the intercepted VOIP call. VOIP system 406 may include a storage 424 for storing VOIP data before or after encryption.

A LEA system 440 may be implemented using LEA system 310 in FIG. 3. LEA system 440 includes a receiving component 442 that receives encrypted VOIP data sent by VOIP system 406 over public data network 408. A decryption component 444 decrypts the encrypted VOIP data and passes the decrypted data to an intercept handling component 446. Intercept handling component 446 processes the decrypted VOIP data as needed by the intercept requesting LEA.

Figure 5:
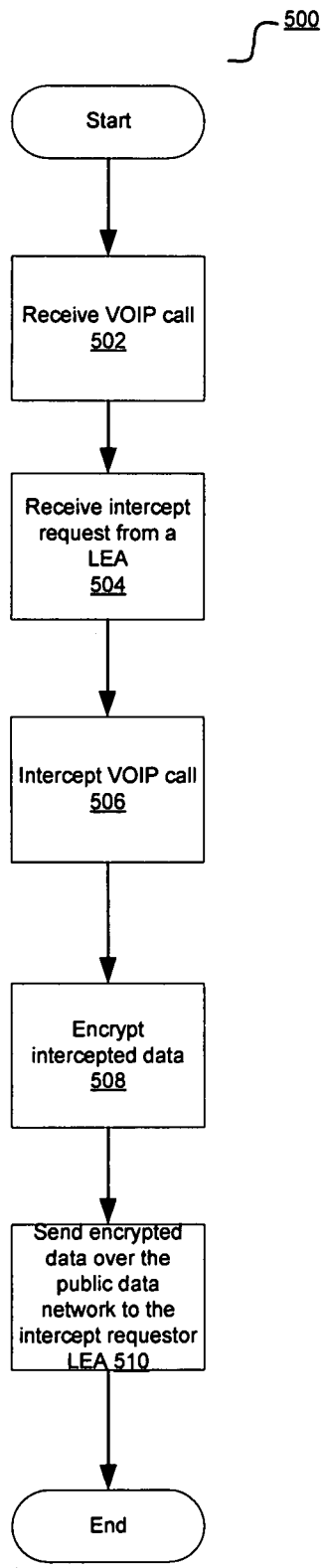
FIG. 5 depicts a flowchart of the process of securely communicating with intercept requesting LEAs in accordance with an illustrative embodiment.

With reference to FIG. 5, this figure depicts a flowchart of the process of securely communicating with intercept requesting LEAs in accordance with an illustrative embodiment. A process 500 may be implemented in VOIP system 406 in FIG. 4.

Process 500 begins by receiving a VOIP call initiation (step 502). In a particular implementation, (step 502) may be omitted as a VOIP call may already be in progress, or VOIP data of a past VOIP call may be stored. The process receives a request to intercept a VOIP call from a LEA (step 504). In a particular implementation, the request may not be expressly made by an LEA but may be a standing request to intercept a VOIP call with certain characteristics. A characteristic of a VOIP call is an aspect of the VOIP call that provides some description of the VOIP call and may be of interest to a LEA. Some examples of characteristics of VOIP call are the caller's identification, the called party's identification, duration of the VOIP call, place of call origination, and place off call termination.

A characteristic of VOIP data is an aspect of the VOIP data that provides some description of the VOIP data that may be of interest to a LEA. For example, frequency of calls from a caller party to a called party is a characteristic of VOIP data. A characteristic of a VOIP call may also be a characteristic of VOIP data. Many other characteristics of a VOIP call and VOIP data are conceivable from this disclosure.

Next, the process intercepts the VOIP call (step 506). The process then encrypts the VOIP data of the intercepted VOIP call (step 508). The encrypted VOIP data is sent to the intercept requesting LEA over the public data network (step 510). The process ends thereafter.

In a specific implementation of the illustrative embodiment, the method of encrypting and securely sending the VOIP data to an LEA may use a virtual private network (VPN) established over the Internet. In another implementation of the illustrative embodiment, an encryption key of a certain key length, such as 256 bits, may be used to encrypt the VOIP data.

In another implementation, bit stuffing may be performed to emulate traffic so that the data stream is not readable to unintended readers of the data. Bit stuffing is the insertion of noninformational bits into valid data. Other techniques for securing data communications over the Internet are well known in the art, and may be used in accordance with the illustrative embodiment without departing from the scope or spirit of the illustrative embodiment. In addition to commonly used encryption techniques, other encryption techniques and method that may not be publicly known, may be custom designed for the purpose of an implementation of the illustrative embodiments specific to a law enforcement agency may also be.

Figure 6:
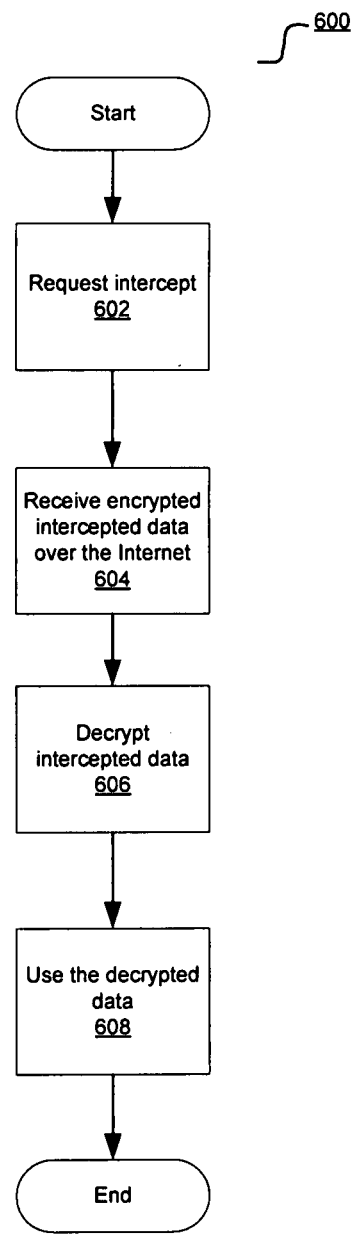
FIG. 6 depicts a flowchart of a process of securely receiving intercepted VOIP data from a VOIP provider in accordance with an illustrative embodiment.

With reference to FIG. 6, this figure depicts a flowchart of a process of securely receiving intercepted VOIP data from a VOIP provider in accordance with an illustrative embodiment. A process 600 may be implemented in LEA system 440 in FIG. 4.

Process 600 begins by requesting an intercept of a VOIP call (step 602). As described with respect to (step 504) in FIG. 5, a specific implementation may omit (step 602) if the LEA does not make an express request but has other arrangements with a VOIP provider, such as a standing request with the VOIP provider to intercept a VOIP call with certain characteristics.

Process 600 proceeds by receiving encrypted VOIP data of the intercepted VOIP call over the Public data network (step 604). The process decrypts the intercepted encrypted data (step 606). The process uses the decrypted data in the manner intended by the intercept requesting LEA (step 608). The process ends thereafter.

The steps of the processes in FIGS. 5 and 6 are depicted only as exemplary for the clarity of the description of the illustrative embodiments. A particular implementation may add other steps, or remove, combine, or further sub-divide the depicted steps to suit a particular requirement without departing from the scope or spirit of the illustrative embodiments.

Only a few features of the illustrative embodiments are described above for the sake of clarity and simplicity of the description. Many other features, variations, and characteristics of the illustrative embodiments are contemplated within the scope of the illustrative embodiments. For example, an illustrative embodiment may include logic in VOIP system 406 in FIG. 4 that is capable of queuing intercept requests received from the various LEAs. Such logic is called queuing logic, and may be a logical component that is a part of a software or hardware component of VOIP system 406 in FIG. 4.

The logic may determine the order in which intercept requests are to be accepted, processed, and responded to, depending on one or more factors. For example, each LEA may be assigned a priority, and a request received from an LEA may be prioritized and queued with other requests according to the requesting LEA's priority. As an example, a county sheriff's office may have a lower priority that the FBI in requesting an intercept of a VOIP call. In such an arrangement, if the county sheriff's office and the FBI request intercepts of VOIP calls, the VOIP provider's resources may be first directed to the FBI's request and then to the county sheriff's request.

The logic may use other rules for prioritizing or queuing intercept requests. For example, a request at a certain time may be queued for processing 30 seconds after the request is received, whereas, a request received at a different time may be queued for processing immediately.

The logic may also queue a request for processing based on the information requested by the LEA in the intercept request. For example, as another rule for prioritizing or queuing intercept requests, a request for only the identity of the caller party or called party may be queued for processing sooner than a request for complete VOIP data of a VOIP call.

Furthermore, VOIP system 406 in FIG. 4 may also include a notification component that notifies LEAs about certain events. In one embodiment, the notification component may be an email application that emails a notification to an LEA. In another embodiment, the notification component may be a phone application or equipment that calls a phone number to provide notifications. In other embodiments, the notification component may be any component suitable for sending a message by phone, fax, email, pager, voice, text, image, or data transmission.

The notification component may provide these notifications based on any events that may be of interest to an LEA, VOIP provider, or both. For example, an event may be the initiation of a VOIP call from a particular caller party identified by name or number. Another exemplary event may be the initiation of a VOIP call to a particular called party in a similar manner. Other exemplary events may include patterns of calls between parties, contents of calls, times and durations of calls, and any other aspect of a VOIP call, caller party, or called party as needed in a particular situation.

Furthermore, the notification component may provide several notifications to several parties for an event. For example, in a joint enforcement situation, an event may trigger notifications to the FBI, the Bureau of Alcohol Tobacco and Firearms (ATF) and the U.S. Customs. Additionally, each notification may use a different method of notification, one going via phone to a cellular phone, another going to a numeric pager, and others going via text messages to email or portable devices.

Encryption component 420 in FIG. 4 may use different types of encryption for responding to different LEAs. For example, some LEAs may use 256 bit key pair encryption using one cipher, whereas another LEA may use 448 bit encryption using a different cipher. Another LEA may use a custom encryption technique that may have been developed for specific security applications. A cipher is a method or algorithm for encoding and decoding. Blowfish, AES, RSA, Serpent, Triple-DES are some examples of encryption ciphers. Encryption component 420 in FIG. 4 may use any encryption method of an LEA's choice, and may use different encryption methods for different LEAs.

Furthermore, encryption component 420 in FIG. 4 may communicate with the notification component described above. Encryption component 420 in FIG. 4 may also encrypt notification messages, as well as notification messages containing all or part of the requested data. Additionally, encryption of a notification to an LEA may use a different encryption method than the encryption method used for encrypting the VOIP data that is requested in the intercept request.

Additionally, VOIP system 406 in FIG. 4 may include an archiving system. Archiving is storage of data according to requirements different from the storage requirements when the data is stored temporarily for further processing. For example, archived data may be stored for a time period longer than the time the data may be stored for further processing, or archived data may be stored in a different data processing system than the data processing system that is to further process the data from the temporary storage. In one embodiment, storage 424 in FIG. 4 may act as a temporary storage for data that is to be further processed by VOIP system. In another embodiment, storage 424 in FIG. 4 may behave as an archive for archived data.

An archiving system may include data storage, archiving rules, and logic for executing those archiving rules. For example, an archiving rule may be that the archiving system archive all VOIP data of all VOIP calls whose caller party and called party match those in an intercept request within the past 90 days. As another example, another archiving rule may be that the archiving system archive the first 3 minutes of all VOIP calls to a certain called party. As another example, an archiving rule may be that all VOIP calls specifically requested to be intercepted be archived indefinitely in accordance with a document retention policy of an LEA for evidentiary purposes. Many other rules, and sets of rules are conceivable for determining the scope of archiving VOIP data. A set of rules is one or more rules. Scope of archiving is the size of VOIP data to be archived, duration of VOIP call to be archived, length of time the archived data is to be preserved, and any combination thereof.

A rules based engine may be a part of VOIP system 406 in FIG. 4. The rules based engine may configure, analyze, execute, and apply rules for intercepting, queuing, notification, encryption, archiving and any other functions performed in VOIP system 406 in FIG. 4.

For example, rules for intercepting a VOIP call may be based on time of the day and day of the week. For example, a different rule for intercepting a VOIP call may be applied on a weekday morning, as compared to the rule for intercepting a VOIP call on a weekend afternoon. As another example, rules for intercepting a VOIP call may be based on instructions from a LEA. For example, a LEA may instruct to intercept calls from a specific caller number to a specific called number, or a call from a caller number at a specific time; or a call to a specific called number during a specified period. These and other instructions provide the basis for creating rules, which are then configured and executed by the rules based engine.

As another example, a LEA, an individual, or an organization that is not a LEA, may specify parameters for rules. For example, an organization may specify one or more individuals to be notified when an event occurs, such as a field agent, a supervisor, or a agency liaison; one or more contact methods to use for such notifications, such as email, phone, pager, fax, or radio; and one or more encryptions to use for such notifications. These and other instructions provide the basis for creating rules, which are then configured and executed by the rules based engine.

As another example, policies and procedures may specify parameters for rules. For example, a document retention policy may specify the number of days VOIP data is to be archived for each LEA, a procedure followed by the VOIP service provider may specify a priority of LEA and a priority of an intercept request from that LEA for queuing; or a procedure may specify whether or not to back-up the archived VOIP data. These and other specifications provide the basis for creating rules, which are then configured and executed by the rules based engine.

Different events may trigger different rules, and different actions may be taken by a VOIP system as a result of the execution of those rules by the rules based engine. The specific rules, parameters specified for those rules, and instructions embodied in those rules are described only for exemplary purposes and are not limiting on the illustrative embodiments. Many other rules may be configured according to a particular situation. A rules based engine as described above may be configured to select and execute those rules in accordance with the illustrative embodiments. For example, various events that may trigger an intercept, notification, or other functions, may include calling party's information, called party's information, key words or phrases detected in a VOIP call, an area code, an international call, and numerous other characteristics of a VOIP call. Any such characteristic may be a basis for a rule, which may then be executed by the rules based engine.

Thus, in the illustrative embodiments described above, a computer implemented method, apparatus, and computer program product provide for securely transmitting lawfully intercepted VOIP data. The illustrative embodiments reduce or remove the costs and complexities in managing dedicated communications links with several LEAs, as is presently done for complying with CALEA. Using the Internet for communicating with LEAs may eliminate the need for dedicated communications links for remaining compliant with CALEA and other similar laws and regulations.

Illustrative embodiments secure the intercepted VOIP data, as it travels over the public Internet to an LEA, using data encryption. Using any of the standard data encryption techniques may reduce or remove the cost of securing the data while complying with the various laws and regulations. Illustrative embodiments allow the flexibility of using specific encryption techniques, including custom encryption techniques that a particular implementation may need.

The illustrative embodiments can take the form of an entirely hardware embodiment, an entirely software embodiment or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

The above description has been presented for purposes of illustration and description, and is not intended to be exhaustive or limited to the illustrative embodiments in the form disclosed. Many modifications and variations will be apparent to those of ordinary skill in the art.

What is claimed:

1. A method for transmitting intercepted VOIP data, the method comprising:
   receiving a plurality of requests to intercept distinct VOIP calls from a plurality of law enforcement agencies;
   placing the plurality of requests for intercept in a queue;
   assigning a priority to one or more of the plurality of requests for intercept in the queue based on a priority assigned to one of the requesting law enforcement agencies with respect to another of the requesting law enforcement agencies to determine a position of one or more requests for intercept in the queue;
   intercepting a VOIP call corresponding to a highest priority request for intercept of the plurality of requests for intercept in the queue;
   encrypting VOIP data associated with the intercepted VOIP call by using one of a virtual private network, an encryption using a key of a specific key length, bit stuffing, and an encryption specific to the law enforcement agency to form encrypted VOIP data; and
   transmitting the encrypted VOIP data to the law enforcement agency over a virtual private network established over the internet between a transmitting component and the law enforcement agency.

2. The method of claim 1, wherein the request is received one of during the VOIP call, before the VOIP call, and after the VOIP call.

3. The method of claim 1, further comprising:
   storing the VOIP data.

4. The method of claim 3, wherein the storing is of the VOIP data before encrypting.

5. The method of claim 3, wherein the storing is of the VOIP data after encrypting but before transmitting.

6. The method of claim 1, wherein the transmitting occurs one of during the VOIP call and after the VOIP call.

7. The method of claim 1, further comprising:
   notifying the law enforcement agency with a notification about an event, wherein the event is related to at least one of the request for intercept, the VOIP call, and the VOIP data.

8. The method of claim 7, wherein the notification is encrypted.

9. The method of claim 7, wherein the notification is delivered to a second law enforcement agency.

10. The method of claim 8, wherein the notification and the VOIP data are encrypted using different encryptions.

11. The method of claim 1, further comprising:
    archiving the VOIP data.

12. The method of claim 11, wherein the archiving is based on a set of rules, and wherein a rule in the set of rules uses at least one of the request for intercept, a characteristic of the VOIP data, and a characteristic of the VOIP call to determine a scope of archiving.

13. A computer usable program product in a non-transitory computer readable medium storing computer executable instructions for transmitting intercepted VOIP data that, when executed, cause a data processing system to:
    receive a plurality of requests to intercept distinct VOIP calls from a plurality of law enforcement agencies;
    place the plurality of requests for intercept in a queue;
    assign a priority to one or more of the plurality of requests for intercept in the queue based on a priority assigned to one of the law enforcement agencies with respect to another of the law enforcement agencies to determine a position of one or more requests for intercept in the queue;

intercept a VOIP call corresponding to a highest priority request for intercept of the plurality of requests for intercept in the queue;

encrypt VOIP data associated with the intercepted VOIP call by using one of a virtual private network, an encryption using a key of a specific key length, bit stuffing, and an encryption specific to the law enforcement agency to form encrypted VOIP data; and transmit the encrypted VOIP data to the law enforcement agency over a virtual private network established over the internet between a transmitting component and the law enforcement agency.

14. The computer usable program product of claim 13, wherein the request is received one of during the VOIP call, before the VOIP call, and after the VOIP call.

15. The computer usable program product of claim 13, further comprising executable instructions that, when executed, cause a data processing system to:

store the VOIP data, forming stored VOIP data.

16. The computer usable program product of claim 15, wherein the stored VOIP data is the VOIP data before encrypting.

17. The computer usable program product of claim 15, wherein the stored VOIP data is the VOIP data after encrypting but before transmitting.

18. The computer usable program product of claim 13, wherein the transmitting occurs one of during the VOIP call and after the VOIP call.

19. The computer usable program product of claim 13, further comprising executable instructions that, when executed, cause the data processing system to:

notify the law enforcement agency with a notification about an event, wherein the event is related to at least one of the request for intercept, the VOIP call, and the VOIP data.

20. The computer usable program product of claim 19, wherein the notification is encrypted.

21. The computer usable program product of claim 19, wherein the notification is delivered to a second law enforcement agency.

22. The method of claim 20, wherein the notification and the VOIP data are encrypted using different encryptions.

23. The computer usable program product of claim 13, further comprising executable instructions that, when executed, cause the data processing system to:

perform archiving of the VOIP data.

24. The computer usable program product of claim 23, wherein the archiving is based on a set of rules, and wherein a rule in the set of rules uses at least one of the request for intercept, a characteristic of the VOIP data, and a characteristic of the VOIP call to determine a scope of archiving.

25. A system for transmitting intercepted VOIP data, the system comprising:

a VOIP system comprising queuing logic to;
receive a plurality of requests to intercept distinct VOIP calls from a plurality of law enforcement agencies;
place the plurality of requests for intercept in a queue;
assign a priority to one or more of the plurality of requests for intercept in the queue based a priority assigned to one of the law enforcement agencies with respect to another of the law enforcement agencies to determine a position of one or more requests for intercept in the queue;

an intercept handling component configured to intercept a VOIP call corresponding to a highest priority request for intercept of the plurality of requests for intercept in the queue;

an encryption component configured to encrypt VOIP data associated with the intercepted VOIP call by using one of a virtual private network, an encryption using a key of a specific key length, bit stuffing, and an encryption specific to the law enforcement agency, to form encrypted VOIP data; and a transmitting component configured to transmit the encrypted VOIP data to the law enforcement agency over a virtual private network established over the internet between the transmitting component and the law enforcement agency.

26. The system of claim 25, wherein the request is received one of during the VOIP call, before the VOIP call, and after the VOIP call.

27. The system of claim 25, further comprising:

a storage configured to store the VOIP data.

28. The system of claim 27, wherein the storing is of the VOIP data before encrypting.

29. The system of claim 27, wherein the storing is of the VOIP data after encrypting but before transmitting.

30. The system of claim 25, wherein the transmitting occurs one of during the VOIP call and after the VOIP call.

31. The system of claim 25, further comprising:

a notification component configured to notify the law enforcement agency with a notification about an event, wherein the event is related to at least one of the request for intercept, the VOIP call, and the VOIP data.

32. The system of claim 31, wherein the notification is encrypted.

33. The system of claim 31, wherein the notification is delivered to a second law enforcement agency.

34. The system of claim 32, wherein the notification and the VOIP data are encrypted using different encryptions.

35. The system of claim 25, further comprising:

an archiving system for archiving the VOIP data.

36. The system of claim 35, wherein the archiving is based on a set of rules, and wherein a rule in the set of rules uses at least one of the request for intercept, a characteristic of the VOIP data, and a characteristic of the VOIP call to determine a scope of archiving.

* * * * *